(12) United States Patent
Zhao et al.

(10) Patent No.: US 9,249,026 B2
(45) Date of Patent: Feb. 2, 2016

(54) METHOD FOR PREPARING GRAPHENE FROM BIOMASS-DERIVED CARBONACEOUS MESOPHASE

(71) Applicants: Shanghai Jiao Tong University, Shanghai (CN); Shanghai Switchdiy Digital Technology Co., Ltd., Shanghai (CN)

(72) Inventors: Binyuan Zhao, Shanghai (CN); Yuxiang Chen, Shanghai (CN); Yijian Lai, Shanghai (CN); Yuesheng Ning, Shanghai (CN); Lei Wang, Shanghai (CN); Jie Zhou, Shanghai (CN); Tongxiang Fan, Shanghai (CN)

(73) Assignees: Shanghai Jiaotong University, Minhang District, Shanghai (CN); SHANGHAI SWITCHDIY DIGITAL TECHNOLOGY CO., LTD., Songjiang District, Shanghai (CN)

( * ) Notice: Subject to any disclaimer, the term of this patent is extended or adjusted under 35 U.S.C. 154(b) by 256 days.

(21) Appl. No.: 14/078,357

(22) Filed: Nov. 12, 2013

(65) Prior Publication Data

US 2015/0133568 A1 May 14, 2015

(51) Int. Cl.
*C01B 31/04* (2006.01)
(52) U.S. Cl.
CPC ......... *C01B 31/0446* (2013.01); *C01B 31/0484* (2013.01)
(58) Field of Classification Search
CPC .................. C01B 31/0446; C01B 31/0484
See application file for complete search history.

(56) References Cited

U.S. PATENT DOCUMENTS

2011/0017585 A1* 1/2011 Zhamu ................ B82Y 30/00
204/157.42

FOREIGN PATENT DOCUMENTS

CN 102807210 * 12/2012 ............. C01B 31/04

* cited by examiner

*Primary Examiner* — Robert Jones, Jr.
(74) *Attorney, Agent, or Firm* — Global IP Services; Tianhua Gu

(57) ABSTRACT

The present invention relates to a method for preparing graphene from a biomass-derived carbonaceous mesophase, which includes: soaking a base substance into an ethanol solution of a biomass-derived carbonaceous mesophase; after a certain period of time, taking out and drying the base substance, a layer of biomass-derived carbonaceous mesophase film being attached to the surface of the base substance; subjecting the base substance to a heat treatment under the protection of a hydrogen atmosphere, then a stacked graphene film was formed on the surface of the base substance; and further subjecting the base substance to ultrasonic dispersion in an alcohol solvent to separate the graphene film and the base substance, then a graphene alcohol was formed. The preparation process of the present invention is easy to implement. The raw material biomass-derived carbonaceous mesophase has abundant sources and is low in cost. The preparation process has low energy consumption, and is applicable to mass production. The obtained graphene film and graphene alcohol can be used in solar cells, nano-electronic devices, sensors, and so on, and have broad market prospects.

10 Claims, 1 Drawing Sheet

METHOD FOR PREPARING GRAPHENE FROM BIOMASS-DERIVED CARBONACEOUS MESOPHASE

BACKGROUND OF THE PRESENT INVENTION

1. Field of Invention

The present invention relates to the technical field of advanced materials, and particularly to a method for preparing graphene from a biomass-derived carbonaceous mesophase.

2. Description of Related Arts

Graphene is a one-atom thick layer of a two-dimensional carbon atom crystal and shapes like a hexagonal honeycomb. It is considered to be the basic structural element of fullerenes, carbon nanotubes, and graphite: if decomposed, the graphene becomes a zero-dimensional fullerene; if curled up, the graphene becomes a seamless hollow tube, namely, a one-dimensional nanotube; and if stacked in a parallel way, the graphene becomes three-dimensional bulk graphite. Since the discovery of the single-layer graphene in 2004, with a series of good physical and chemical properties such as its unique optical property, outstanding thermal conductivity and mechanical property, and extraordinary electron conduction performance, graphene has attracted wide attention and great interests of scientists.

Current graphene preparation methods mainly include mechanical exfoliation, epitaxial growth on SiC or metal substrates, graphite oxide reduction, chemical vapor deposition, and the like. In mechanical exfoliation, graphene wafers are repeatedly exfoliated from highly oriented pyrolytic graphite through a transparent photoresist. The method has a small yield, is low in production efficiency and poor in repeatability, and is limited to the production in laboratory only. By means of epitaxial growth on SiC, large-area and high-quality graphene wafers can be prepared, but the preparation conditions require high temperature and high vacuum, which results in high costs of raw materials and process control. The chemical vapor deposition uses carbon-containing compounds as a carbon source, decomposes the carbon source on the metal base at a high temperature, and deposits the decomposed carbon source on the surface of the base; the obtained graphene wafer is spliced by small sized graphene flakes, and the presence of crystal boundary affects the performance of graphene.

According to the research on the prior art documents, the Patent Publication No. CN 102409399A discloses a method for preparing high-quality graphene, in which a graphene wafer formed by opening single-walled or multi-walled carbon nanotubes is used as a seed crystal, and by means of chemical vapor deposition, graphene is grown on the substrate surface with the seed crystal as a core. This method prepares a large-scale and low-defect graphene material, but uses an expensive raw material, namely the carbon nanotube, which is also short of sources. Besides, the carbon nanotubes need to be opened through ion etching or chemical oxidization to form graphene as a seed crystal, which increases the complexity of the experiment process.

The Chinese Patent Publication No. CN 1421477A discloses a method for preparing an optically anisotropic carbonaceous mesophase by using a biomass resource material and waste thereof as raw materials and performing a serious of processing thereon. The biomass-derived carbonaceous mesophase has abundant sources, is cheap and environmental-friendly, and is applicable to mass industrial production. Moreover, different from the carbonaceous mesophase produced with petroleum and coal as raw materials, the biomass-derived carbonaceous mesophase has a larger inter-layer spacing. There have been a lot of reports about the preparation of graphite from the carbonaceous mesophase produced with petroleum and coal as raw materials, so the biomass-derived carbonaceous mesophase can be used as a precursor to prepare graphene.

SUMMARY OF THE PRESENT INVENTION

An object of the present invention is to provide a method for preparing graphene from a biomass-derived carbonaceous mesophase so as to solve the problems in the prior art. The preparation process is easy to implement; the preparation procedure has low energy consumption and is applicable to mass production.

The object of the present invention can be realized through the following technical solution:

A method for preparing graphene from a biomass-derived carbonaceous mesophase comprises the following steps:

(1) soaking a base substance into an ethanol solution of a biomass-derived carbonaceous mesophase with a certain concentration, and after 10 minutes to 2 hours, taking out and drying the base substance, a layer of biomass-derived carbonaceous mesophase film being attached on the surface of the base substance;

(2) subjecting the base substance to a heat treatment under the protection of a hydrogen-containing atmosphere, then a stacked graphene film was formed on the surface of the base substance; and (3) further subjecting the base substance to ultrasonic dispersion in an alcohol solvent to separate the graphene film and base substance, then a graphene alcohol, which is a product, was formed.

The base substance is one of wafer or powdery single crystalline silicon, polycrystalline silicon, mica, and quartz.

The concentration of the ethanol solution of the biomass-derived carbonaceous mesophase is 0.01 to 5 wt %.

The ethanol solution of the biomass-derived carbonaceous mesophase refers to a solution prepared by dissolving a biomass-derived carbonaceous mesophase in absolute ethyl alcohol, where the biomass-derived carbonaceous mesophase is prepared according to the Patent Application No. CN1421477A. A temperature during the drying is room temperature to 100° C.

The hydrogen-containing atmosphere is pure hydrogen or a mixture of hydrogen and nitrogen or another inert gas.

The other inert gas comprises helium or argon, and the percent by volume of hydrogen is greater than 75%.

A temperature of the heat treatment is 600 to 1000° C., and a processing time is 1 to 6 hours.

The alcohol solvent is one of methanol, ethanol, normal propanol, isopropanol, normal butanol, 1-pentanol, and ethylene glycol.

The alcohol solvent is preferably ethanol.

The biomass-derived carbonaceous mesophase is a liquid crystal having a fused-ring aromatic chemical structure, and forms a layered structure on the surface of the base substance. Each unit has a polar group such as hydroxyl on the edge. During the heat treatment, when the temperature rises, these polar groups are assembled with each other and undergo polycondensation on the plane, and therefore, some units are integrated into larger graphene wafers having a two-dimensional crystal structure. In the direction perpendicular to the plane, the heating process would decrease the inter-layer spacing between graphene wafers, thereby forming graphite crystals. However, under the protection of the hydrogen atmosphere, hydrogen atoms in hydrogen molecules can form hydrogen bonds with the polar groups on the surface of the graphene wafers, hence can be inserted between two layers of graphene wafers, preventing the graphene wafers from forming graphite crystals due to a significant decline of the inter-layer spacing, hence maintaining the stability of the graphene structure.

Compared with the prior art, the present invention uses the optically anisotropic biomass-derived carbonaceous mesophase as a material, which contributes to desirable performance and a large inter-layer spacing; the material has abundant sources, is cheap and environmental-friendly. The present invention is an application of the biomass-derived carbonaceous mesophase and provides a novel technology for preparing graphene. The preparation process of the present invention is easy to implement; the preparation process has low energy consumption and is applicable to mass production. The obtained graphene film and graphene alcohol can be used in solar cells, nano-electronic devices, sensors, and so on, and have broad market prospects.

DETAILED DESCRIPTION OF THE PREFERRED EMBODIMENTS

The present invention is described in detail below with reference to the accompanying drawings and specific embodiments. The embodiment is carried out based on the technical solution of the present invention. Detailed implementation manners and specific operation processes are provided, but the protection scope of the present invention is not limited to the following embodiments.

Embodiment 1

Figure 1:
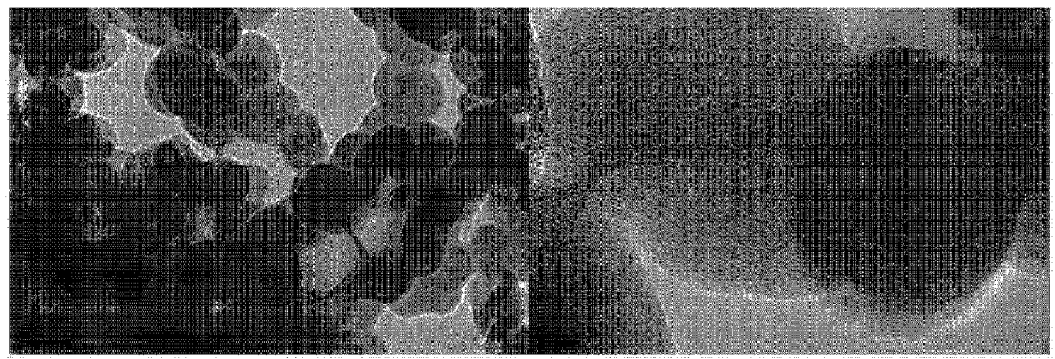
FIG. 1 is a transmission electron microscope photo of a stacked graphene film prepared in Embodiment 1.

A single crystalline silicon wafer was soaked into an ethanol solution of a biomass-derived carbonaceous mesophase with a concentration of 0.01 wt %. The single crystalline silicon was taken out after 30 minutes, and was dried at room temperature, and then a layer of biomass-derived carbonaceous mesophase film was attached on the surface of the single crystalline silicon wafer. The single crystalline silicon wafer was subject to a heat treatment at a temperature of 600° C. for 6 hours under the protection of a pure hydrogen atmosphere. Then a stacked graphene film was formed on the surface of the single crystalline silicon wafer. The transmission electron microscope photo thereof is shown in FIG. 1. Furthermore, the single crystalline silicon wafer was subject to ultrasonic dispersion in ethanol, to obtain an ethanol sol of graphene.

Embodiment 2

Figure 2:
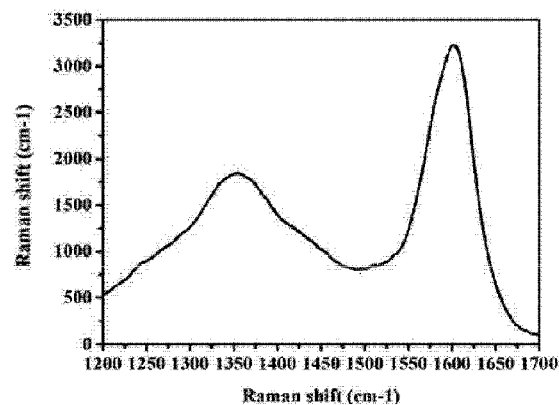
FIG. 2 shows Raman spectral characterization of a stacked graphene film prepared in Embodiment 2.

A polycrystalline silicon wafer was soaked into an ethanol solution of a biomass-derived carbonaceous mesophase with a concentration of 0.5 wt %. The polycrystalline silicon wafer was taken out after 30 minutes, and was dried at room temperature, and then a layer of biomass-derived carbonaceous mesophase film was attached on the surface of the polycrystalline silicon wafer. The polycrystalline silicon wafer was subject to a heat treatment at a temperature of 800° C. for 2 hours under the protection of a pure hydrogen atmosphere, namely. Then a stacked graphene film was formed on the surface of the polycrystalline silicon wafer. The Raman spectrum is shown in FIG. 2. Furthermore, the polycrystalline silicon wafer was subject to ultrasonic dispersion in ethylene glycol, to obtain an ethylene glycol sol of graphene.

Embodiment 3

Polycrystalline powder was soaked into an ethanol solution of a biomass-derived carbonaceous mesophase with a concentration of 1 wt %. The polycrystalline powder was taken out after 20 minutes and was dried at a temperature of 60° C., and then a layer of biomass-derived carbonaceous mesophase film was attached on the surface of the polycrystalline powder. The polycrystalline powder was subject to a heat treatment at a temperature of 800° C. for 2 hours under the protection of a pure hydrogen atmosphere. Then a stacked graphene film was formed on the surface of the polycrystalline powder. Furthermore, the polycrystalline powder was subject to ultrasonic dispersion in methanol, to obtain a methanol sol of graphene.

Embodiment 4

A mica wafer was soaked into an ethanol solution of a biomass-derived carbonaceous mesophase with a concentration of 2 wt %. The mica wafer was taken out after 1 hour and was dried at a temperature of 80° C., and then a layer of biomass-derived carbonaceous mesophase film was attached on the surface of the mica wafer. The mica wafer was subject to a heat treatment at a temperature of 1000° C. for 1 hour under the protection of a mixture of hydrogen and argon (the percent by volume of hydrogen is 80%). Then a stacked graphene film was formed on the surface of the mica wafer. Furthermore, the mica wafer was subject to ultrasonic dispersion in isopropanol, to obtain an isopropanol sol of graphene.

Embodiment 5

A quartz wafer was soaked into an ethanol solution of a biomass-derived carbonaceous mesophase with a concentration of 2 wt %. The quartz wafer was taken out after 2 hours and was dried at room temperature, and then a layer of biomass-derived carbonaceous mesophase film was attached on the surface of the quartz wafer. The quartz wafer was subject to a heat treatment at a temperature of 900° C. for 2 hours under the protection of a mixture of hydrogen and nitrogen (the percent by volume of hydrogen is 90%). Then a stacked graphene film was formed on the surface of the quartz wafer. Furthermore, the quartz wafer was subject to ultrasonic dispersion in normal butanol, to obtain a normal butanol sol of graphene.

Embodiment 6

Figure 3:
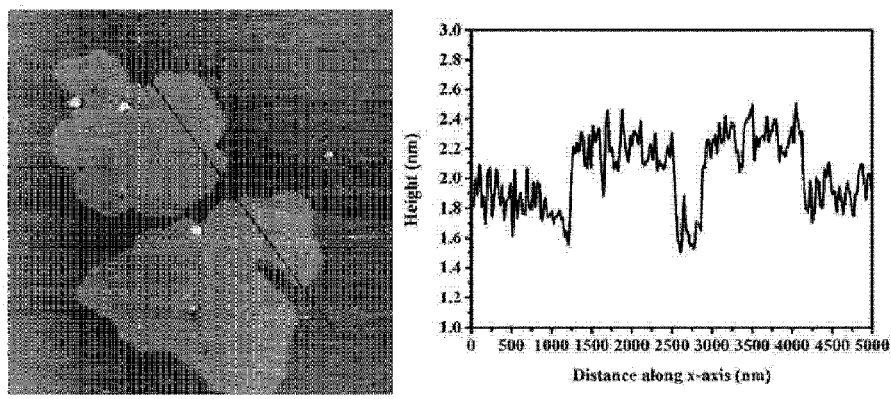
FIG. 3 shows atomic force microscope characterization of a stacked graphene film prepared in Embodiment 3.

A quartz wafer was soaked into an ethanol solution of a biomass-derived carbonaceous mesophase with a concentration of 5 wt %. The quartz wafer was taken out after 1 hour and was dried at a temperature of 100° C., and then a layer of biomass-derived carbonaceous mesophase film was attached on the surface of the quartz wafer. The quartz wafer was subject to a heat treatment at a temperature of 900° C. for 2 hours under the protection of a mixture of hydrogen and helium (the percent by volume of hydrogen is 90%). Then a stacked graphene film was formed on the surface of the quartz wafer. The force microscope characterization is shown in FIG. 3. Furthermore, the quartz wafer was subject to ultrasonic dispersion in ethanol, to obtain an ethanol sol of graphene.

Embodiment 7

A method for preparing graphene from a biomass-derived carbonaceous mesophase includes the following steps:

(1) soaking wafer mica into an ethanol solution of a biomass-derived carbonaceous mesophase with a concentration of 0.01 wt %, and after 2 hours, taking out and drying the wafer mica at room temperature, a layer of biomass-derived carbonaceous mesophase film being attached on the surface of the wafer mica;

(2) subjecting the base substance to a heat treatment at a temperature of 600° C. for 6 hours under the protection of a pure hydrogen atmosphere, then a stacked graphene film was formed on the surface of the base substance; and (3) further subjecting the base substance to ultrasonic dispersion in normal butanol to separate the graphene film and base substance, then a graphene alcohol, which is a product, was formed.

Embodiment 8

A method for preparing graphene from a biomass-derived carbonaceous mesophase includes the following steps:

(1) soaking powdery quartz into an ethanol solution of a biomass-derived carbonaceous mesophase with a concentration of 5 wt %, and after 10 minutes, taking out and drying the base substance at a temperature of 100° C., a layer of biomass-derived carbonaceous mesophase film being attached on the surface of the powdery quartz;

(2) subjecting the base substance to a heat treatment at a temperature of 1000° C. for 1 hour under the protection of an atmosphere of helium and hydrogenate (the percent by volume of hydrogen is greater than 75%), then a stacked graphene film was formed on the surface of the base substance; and (3) further subjecting the base substance to ultrasonic dispersion in 1-pentanol to separate the graphene film and base substance, then a graphene alcohol, which is a product, was formed.

What is claimed is:

1. A method for preparing graphene from a biomass-derived carbonaceous mesophase, comprising the following steps:
   (1) soaking a base substance into an ethanol solution of a biomass-derived carbonaceous mesophase with a certain concentration, and after 10 minutes to 2 hours, taking out and drying the base substance, a layer of biomass-derived carbonaceous mesophase film being attached on the surface of the base substance;
   (2) subjecting the base substance to a heat treatment under the protection of a hydrogen-containing atmosphere, then a stacked graphene film was formed on the surface of the base substance; and
   (3) further subjecting the base substance to ultrasonic dispersion in an alcohol solvent to separate the graphene film and base substance, then a graphene alcohol, which is a product, was formed.

2. The method for preparing graphene from a biomass-derived carbonaceous mesophase as in claim 1, wherein the base substance is one of wafer or powdery single crystalline silicon, polycrystalline silicon, mica, and quartz.

3. The method for preparing graphene from a biomass-derived carbonaceous mesophase as in claim 1, wherein the ethanol solution of the biomass-derived carbonaceous mesophase refers to a solution prepared by dissolving a biomass-derived carbonaceous mesophase in absolute ethyl alcohol.

4. The method for preparing graphene from a biomass-derived carbonaceous mesophase as in claim 1, wherein the concentration of the ethanol solution of the biomass-derived carbonaceous mesophase is 0.01 to 5 wt %.

5. The method for preparing graphene from a biomass-derived carbonaceous mesophase as in claim 1, wherein a temperature during the drying is room temperature to 100° C.

6. The method for preparing graphene from a biomass-derived carbonaceous mesophase as in claim 1, wherein the hydrogen-containing atmosphere is pure hydrogen or a mixture of hydrogen and nitrogen or another inert gas.

7. The method for preparing graphene from a biomass-derived carbonaceous mesophase as in claim 6, wherein the other inert gas comprises helium or argon, and the percent by volume of hydrogen is greater than 75%.

8. The method for preparing graphene from a biomass-derived carbonaceous mesophase as in claim 1, wherein a temperature of the heat treatment is 600 to 1000° C., and a processing time is 1 to 6 hours.

9. The method for preparing graphene from a biomass-derived carbonaceous mesophase as in claim 1, wherein the alcohol solvent is one of methanol, ethanol, normal propanol, isopropanol, normal butanol, 1-pentanol, and ethylene glycol.

10. The method for preparing graphene from a biomass-derived carbonaceous mesophase as in claim 9, wherein the alcohol solvent is ethanol.

* * * * *